No. 790,716. PATENTED MAY 23, 1905.
H. M. BROOKFIELD.
MACHINERY FOR THE MANUFACTURE OF GLASSWARE.
APPLICATION FILED JULY 21, 1903.

2 SHEETS—SHEET 1.

WITNESSES:
Charles F. Murphy
Harold North

INVENTOR
Henry M. Brookfield
BY
Frank Brookfield
ATTORNEY

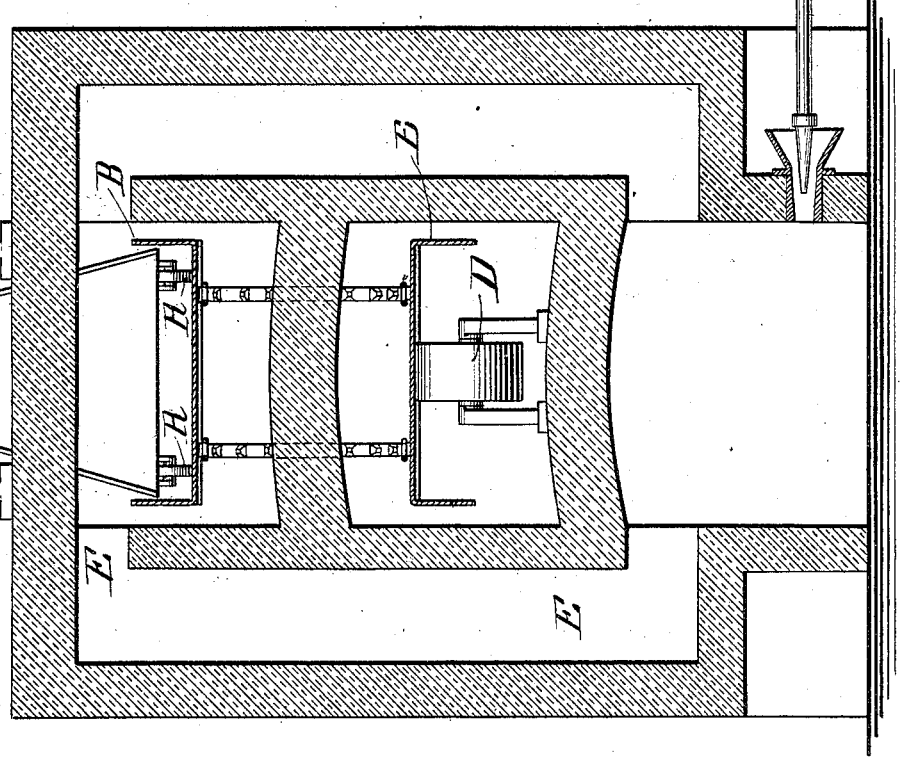

No. 790,716. Patented May 23, 1905.

UNITED STATES PATENT OFFICE.

HENRY M. BROOKFIELD, OF NEW YORK, N. Y.

MACHINERY FOR THE MANUFACTURE OF GLASSWARE.

SPECIFICATION forming part of Letters Patent No. 790,716, dated May 23, 1905.

Application filed July 21, 1903. Serial No. 166,454.

*To all whom it may concern:*

Be it known that I, HENRY M. BROOKFIELD, a citizen of the United States, residing at 516 Madison avenue, borough of Manhattan, city of New York, county and State of New York, have invented certain new and useful Improvements in Machinery for the Manufacture of Glassware, of which the following is a specification, reference being had therein to the accompanying drawings.

My invention relates to a device for handling glassware; and my object is to improve and simplify the construction.

Figure 1:
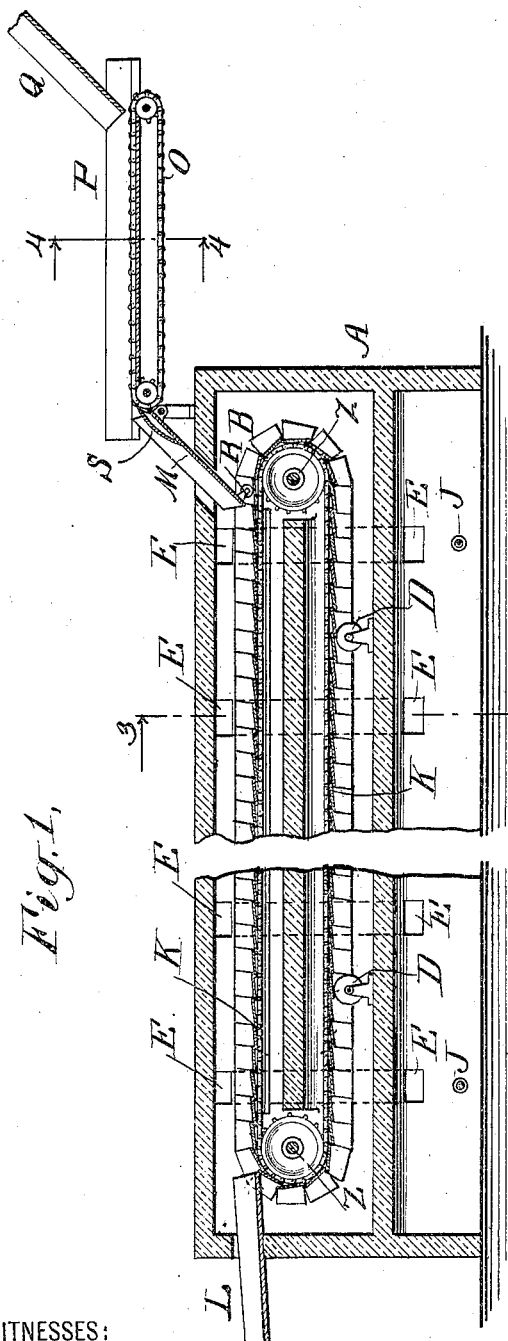
Figure 2:
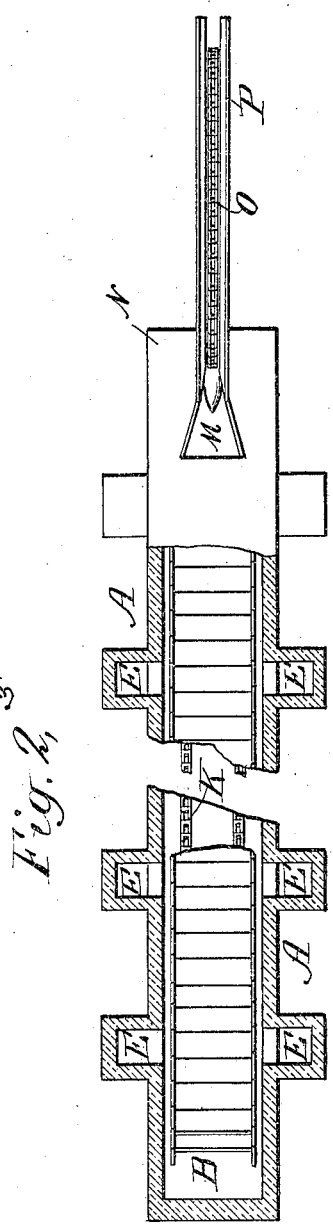

In the preferred embodiment of my invention shown in the drawings, Figure 1 is a vertical section of a side elevation; Fig. 2, a section of the same, partly in plan view. Fig. 3 is a vertical section on the line 3 3 of Fig. 1. Fig. 4 is a section on the line 4 4 of Fig. 1, and Fig. 5 is a detail.

In the preferred embodiment shown in the drawings, A is an annealing-oven, which is preferably of the form shown in the different figures, said oven being of an elongated form and having flues E for the air, which is heated by suitable heating-jets, one of which is indicated at J in Fig. 3. The flues E, as shown in Fig. 3, preferably extend up to the top of the oven, so that the air impinges upon the glassware, substantially as shown in Fig. 3.

In the oven and running lengthwise thereof I have provided an endless conveyer, consisting in this embodiment of a link belt K K, passing over sprocket-wheels Z Z, suitably driven, and having open-ended pans B B attached to the belt and preferably overlapping each other, so as to form an endless moving trough.

D D are suitable supporting-rollers underneath the belt.

Outside of the machine is an endless conveyer O, moving in the trough P and having at its end an open-ended trough M, inclined downwardly and passing through a hole in the top of the oven near one end thereof, the trough terminating above the pans. This trough M may, if desired, be provided with a pair of rollers R, resting on the pans B.

Q is an inclined trough leading to the conveyer O, and L is a chute leading from the oven, which may be provided, if desired.

The ware to be annealed slides down the trough Q onto the conveyer O, which carries it to the trough M, down which it slides through the opening at the top of the oven onto the endless conveyer therein, by which it is carried through the oven and, if desired, may pass out of the same by the trough L.

S is a spring upon the trough M for suitably directing the articles as they come from the conveyer O and pass into the oven.

It is of a distinct advantage that the ware shall pass through the top of the oven, as this is the hottest part of the oven, and the endless conveyer in the oven may therefore be located close to the top and the articles may be more easily and certainly deposited on the series of pans.

I am aware that some changes may be made in the construction without departing from the spirit of my invention as claimed, and I therefore do not desire to be limited to the construction illustrated.

What I claim is—

1. In a machine for treating glassware in combination, an elongated oven having therein and running lengthwise thereof an endless conveyer comprising a belt having attached thereto an endless series of open-ended pans, said oven having a top provided with a hole therein near one end thereof and above said conveyer, an inclined chute passing through said hole and terminating close above said conveyer, and an endless conveyer leading to said chute.

2. In a machine for treating glassware in combination, an elongated oven having therein and close to the top thereof and running lengthwise thereof an endless conveyer, said oven having a top provided with a hole therein near one end thereof and above said conveyer, an inclined chute passing through said hole and terminating close above said conveyer, said oven having one or more heating-flues running above the bottom of said conveyer whereby the heated air will be discharged downwardly upon the articles carried by said conveyer.

3. In a machine for treating glassware in combination, an elongated oven having therein and running lengthwise thereof an endless conveyer comprising a belt having attached thereto an endless series of open-ended pans, said oven having a top provided with a hole therein near one end thereof and above said conveyer, an inclined chute passing through said hole and terminating close above said conveyer, and an endless conveyer leading to said chute, said oven also having one or more heating-flues terminating above the bottom of said conveyer and adapted to discharge heated air downward upon articles carried thereby.

In testimony whereof I have signed my name to this specification in the presence of two subscribing witnesses.

HENRY M. BROOKFIELD.

Witnesses:
    CHARLES F. MURPHY,
    HAROLD NORTH.